US008672533B2

(12) United States Patent
Reyes et al.

(10) Patent No.: US 8,672,533 B2
(45) Date of Patent: Mar. 18, 2014

(54) BLENDER JAR LID WITH STRAINER

(75) Inventors: Aurelio Reyes, Sugar Grove, IL (US); Carlos Castellanos, New Port Richey, FL (US)

(73) Assignee: Spectrum Brands, Inc., Middleton, WI (US)

( * ) Notice: Subject to any disclaimer, the term of this patent is extended or adjusted under 35 U.S.C. 154(b) by 1530 days.

(21) Appl. No.: 11/549,421

(22) Filed: Oct. 13, 2006

(65) Prior Publication Data

US 2007/0147171 A1    Jun. 28, 2007

Related U.S. Application Data

(60) Provisional application No. 60/726,714, filed on Oct. 14, 2005.

(51) Int. Cl.
*A47J 43/046* (2006.01)
(52) U.S. Cl.
USPC ............................. 366/205; 210/466; 222/565
(58) Field of Classification Search
USPC .................. 210/464–469; 222/151, 517, 565; 241/199.12, 282.1, 282.2; 366/192, 366/199, 205, 314, 347, 206; D7/392, 413
See application file for complete search history.

(56) References Cited

U.S. PATENT DOCUMENTS

| | | | | |
|---|---|---|---|---|
| 186,690 A * | 1/1877 | Piper | ............................. | 222/517 |
| 302,483 A * | 7/1884 | Haslage | ................... | 222/189.07 |
| 348,752 A * | 9/1886 | Lemos | ........................... | 222/517 |
| 420,262 A * | 1/1890 | Boemermann | ............... | 366/247 |
| 776,917 A * | 12/1904 | Kingsbury | ............... | 222/189.07 |
| 801,073 A * | 10/1905 | Fulton | ........................ | 222/142.6 |
| 887,098 A * | 5/1908 | Klein et al. | .................... | 210/245 |
| 1,015,396 A * | 1/1912 | Parsons | ..................... | 222/189.07 |
| 1,139,841 A * | 5/1915 | Bright | ........................ | 222/142.6 |
| 1,327,532 A * | 1/1920 | Duvall | ..................... | 222/189.07 |
| 1,498,588 A * | 6/1924 | Sturdevant | .................... | 210/245 |
| 1,639,093 A * | 8/1927 | Kircher | ......................... | 210/245 |
| 2,030,266 A * | 2/1936 | Pollock | ........................ | 210/245 |
| 2,047,176 A * | 7/1936 | Cisco | ........................... | 210/245 |
| 2,315,018 A * | 3/1943 | Lawrence | ........................ | 99/501 |
| 2,753,051 A * | 7/1956 | Tupper | ......................... | 210/239 |
| 2,886,218 A * | 5/1959 | William | ........................ | 222/517 |
| 2,939,617 A * | 6/1960 | Hassler | ......................... | 222/556 |
| 3,081,912 A | 3/1963 | Goceliak | ........................ | 222/189 |
| 3,131,824 A * | 5/1964 | Van Baarn | ............... | 222/153.07 |
| 3,217,949 A * | 11/1965 | Davis | ............................ | 222/480 |
| 3,248,016 A | 4/1966 | Dahl et al. | ..................... | 222/189 |
| 3,417,972 A * | 12/1968 | Conway | ..................... | 241/199.12 |
| 3,916,776 A * | 11/1975 | Arao et al. | ........................ | 99/503 |
| 4,369,901 A * | 1/1983 | Hidding | ......................... | 222/480 |
| D283,099 S * | 3/1986 | Shabram et al. | ............... | D7/392 |

(Continued)

*Primary Examiner* — Charles E Cooley
(74) *Attorney, Agent, or Firm* — Armstrong Teasdale LLP

(57) ABSTRACT

In an electric blender having a lid assembly including a strainer, the blender includes a base including a motor; a jar with a top aperture and an impeller; and a lid for removably covering the jar. The lid includes a strainer section and a closer. The strainer section includes holes extending through the lid to allow contents of a predetermined size to flow out of the jar. The closer includes a pivot arm having an end pivotably connected to the first section. The pivot arm has a flat portion near the end. The flat portion is configured to contact the first section of the lid to maintain the closer in an open position relative to the strainer section. The first section has a recessed area above the strainer section.

15 Claims, 4 Drawing Sheets

(56) References Cited

U.S. PATENT DOCUMENTS

| | | | |
|---|---|---|---|
| 5,330,082 A * | 7/1994 | Forsyth | 222/480 |
| D370,151 S * | 5/1996 | McLinden et al. | D7/378 |
| 5,690,021 A * | 11/1997 | Grey | 99/513 |
| 5,749,285 A * | 5/1998 | Dorner et al. | 99/348 |
| D395,803 S * | 7/1998 | Lallemand | D7/665 |
| 5,901,885 A * | 5/1999 | Iida | 222/517 |
| 6,059,445 A | 5/2000 | St. John | 366/205 |
| 6,065,861 A * | 5/2000 | Chen | 366/144 |
| 6,070,519 A * | 6/2000 | Sham et al. | 99/348 |
| 6,135,018 A * | 10/2000 | Yu et al. | 99/504 |
| 6,138,556 A * | 10/2000 | Yu et al. | 99/504 |
| 6,223,652 B1 * | 5/2001 | Calia et al. | 99/513 |
| 6,363,837 B1 * | 4/2002 | Sham et al. | 99/348 |
| 6,575,323 B1 * | 6/2003 | Martin et al. | 220/254.3 |
| 6,609,821 B2 * | 8/2003 | Wulf et al. | 366/206 |
| D491,423 S * | 6/2004 | Stamper et al. | D7/665 |
| 6,817,750 B1 * | 11/2004 | Sands | 366/205 |
| 7,117,784 B2 * | 10/2006 | de Groote | 99/508 |
| D534,394 S * | 1/2007 | Zhiwen et al. | D7/378 |
| 7,354,192 B2 * | 4/2008 | Jejcic | 366/347 |
| 7,371,004 B1 * | 5/2008 | Branson et al. | 366/130 |
| 7,384,182 B2 * | 6/2008 | Bhavnani | 366/130 |
| D572,531 S * | 7/2008 | Romandy et al. | D7/510 |
| 7,422,361 B2 * | 9/2008 | Pryor et al. | 366/197 |
| 7,506,656 B2 * | 3/2009 | Cerruti | 134/99.2 |
| 2006/0126431 A1 * | 6/2006 | Bhavnani | 366/314 |
| 2007/0007310 A1 * | 1/2007 | Antal et al. | 222/480 |
| 2007/0147171 A1 * | 6/2007 | Reyes et al. | 366/205 |
| 2009/0026204 A1 * | 1/2009 | Ek | 220/318 |
| 2009/0145839 A1 * | 6/2009 | Miga, Jr. | 210/466 |
| 2009/0161482 A1 * | 6/2009 | Sandford | 366/192 |
| 2009/0194536 A1 * | 8/2009 | Ulstein et al. | 220/270 |
| 2013/0233897 A1 * | 9/2013 | Mack | 222/565 |

* cited by examiner

BLENDER JAR LID WITH STRAINER

CROSS-REFERENCE TO RELATED APPLICATION

This application claims the benefit of U.S. Provisional Application No. 60/726,714, filed Oct. 14, 2005, the contents of which are incorporated herein in their entirety by this reference.

TECHNICAL FIELD OF THE INVENTION

The invention relates to a blender and, more particularly, to a lid used with a jar of a blender.

BACKGROUND OF THE INVENTION

Brief Description of Prior Developments

Blenders are typically used as a kitchen appliance to process foodstuff and other materials such as, for example, the mixing of liquids, the blending of solids and liquids, and the liquefying of fruits, vegetables, and other items.

Typically, a power-operated blender includes a base housing which contains an electric motor. A jar with a lid is positionable on, and usually secured to, a jar mount of the housing and includes a mixing implement which is coupled to a drive shaft of the motor when the jar is positioned on the housing. Various control buttons are located on the exterior of the housing to provide for external control of the motor during the operation of the blender.

In use of the blender, the jar is placed on and typically secured to the jar mount of the base housing and the lid is removed to reveal an opening of the jar. Selected foodstuff is deposited into the jar and the lid is then placed over the opening of the jar. Selected buttons are then manipulated to operate the motor whereby the implement works the contents into a desired blend and consistency. The jar is removed from the housing and the lid is removed to access the blended contents.

Traditionally, once the blending cycle is complete the blended contents are poured or otherwise removed from the jar. Often times, the contents include elements that may be undesirable such as larger particles or materials.

SUMMARY OF THE INVENTION

The problems noted above are addressed by the present invention. In accordance with one aspect of the present invention, an electric blender is provided including a base section including a motor; a jar section removably connected to the base section; and a lid section. The jar section includes a jar and a rotatable impeller at a base of the jar. The jar includes a top aperture. The lid section is removably connected to the jar at the top aperture. The lid section includes a strainer section and a closer. The strainer section includes holes adapted to allow solids of a predetermined size and liquid to flow out of the jar and retain solids of a predetermined size inside the jar. The closer is adapted to close the strainer section to prevent liquid from exiting the strainer section such as during a blender operation when the impeller is rotated by the motor.

In accordance with another aspect of the invention, an electric blender is provided including a base section including a motor; a jar section removably connected to the base section, wherein the jar section includes a jar and a rotatable impeller at a base of the jar, wherein the jar includes a top aperture; and a lid connected to the jar at the top aperture. The lid includes a first section and a second section. The first section includes a recessed area having a plurality of holes adapted to allow solids of a predetermined size and liquid to pass through the holes and prevent solids of a predetermined size from passing through the holes. The second section includes a flap pivotably connected to the first section and adapted to be substantially located in the recessed area in one aspect of the invention and entirely located in the recessed area in another aspect of the invention. The second section is movable between a closed position to block the holes in the first section and an open position to allow flow of liquid out of the holes.

In accordance with another aspect of the invention, a lid for a blender is provided including a first section with a strainer including holes through the first section, wherein the first section is adapted to be attached to a blender jar at a top open aperture of the jar and substantially close the top open aperture, and wherein the first section includes a recessed area above the holes; and a flap connected to the first section. The flap is moveable between a closed position in the recessed area to block the holes in the first section and an open position moved substantially out of the recessed area so as to permit liquids or contents of a predetermined size within the jar to be poured through the holes.

In accordance with one method of the invention, a method of manufacturing an electric blender lid is provided including forming a first section with a strainer including holes through the first section, wherein the first section is adapted to be attached to a blender jar at a top open aperture of the jar and substantially close the top open aperture, and wherein the first section is formed with a recessed area above the holes; and connecting a flap to the first section. The flap is moveable between a closed position in the recessed area to block the holes in the first section and an open position moved substantially out of the recessed area.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
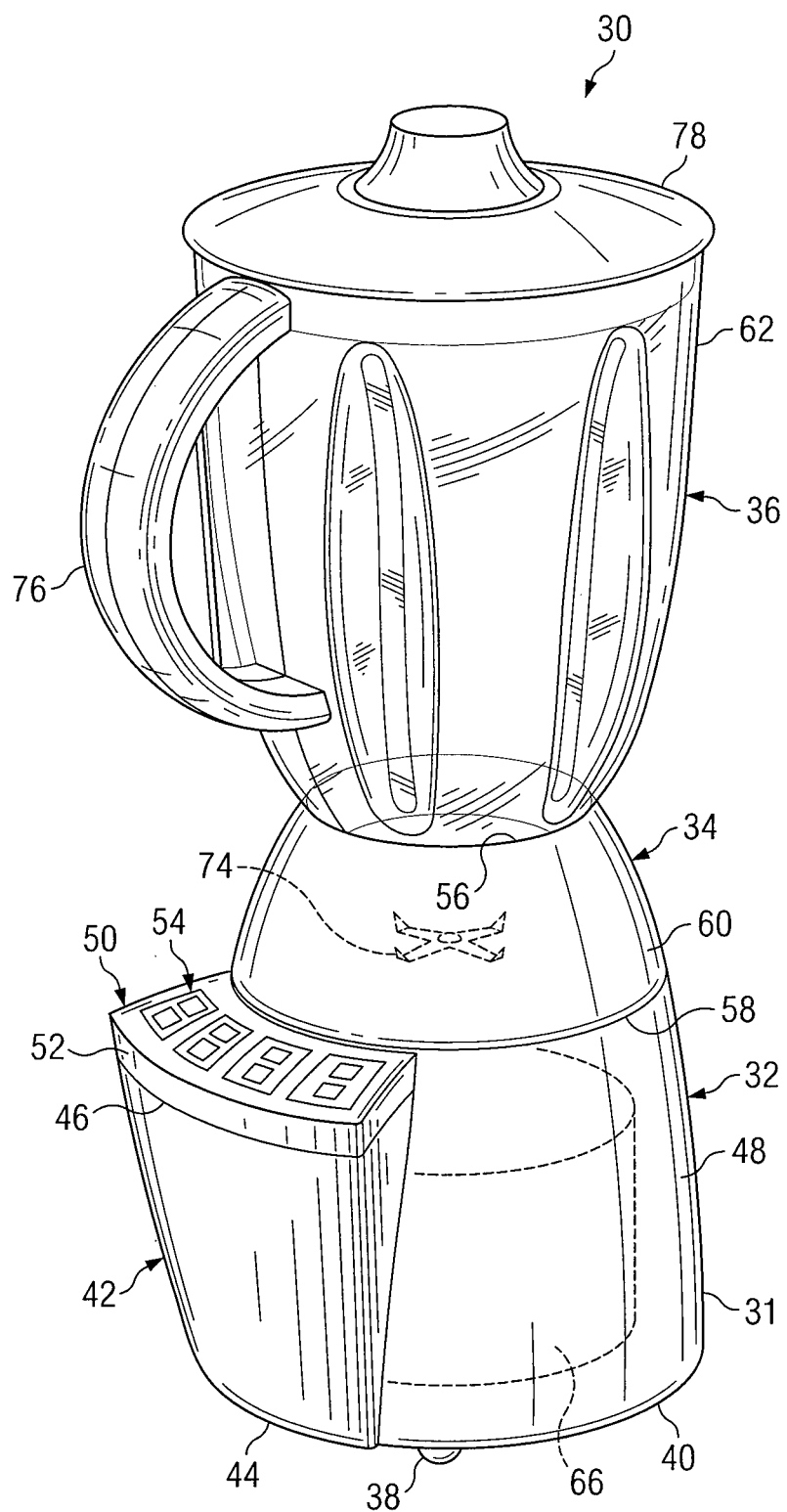
FIG. 1 is a perspective view of an electric blender incorporating features of an embodiment of the invention.

Referring to FIG. 1, there is shown a perspective view of an electric blender 30 incorporating features of an embodiment of the invention. Although the invention will be described with reference to the exemplary embodiment shown in the drawings, it should be understood that the invention can be embodied in many alternate forms of embodiments. In addition, any suitable size, shape or type of elements or materials may be used.

In the depicted embodiment, blender 30 generally includes a base section 31, a jar section 36, and a lid section 78. Base section 31 includes a base housing 32 and a jar mount 34. In this embodiment, base section 31 is a conventional base section. Jar section 36 generally includes a jar 62 and a rotatable blending implement or impeller 74 (not depicted) at the base of jar 62.

Base housing 32 may include a plurality of feet 38 which are located on a bottom 40 of base housing 32 and which may be formed with a housing extension 42. Extension 42 includes a bottom 44 which extends laterally away from base housing 32 for a prescribed distance in a plane in which bottom 40 of base housing 32 is located. A top 46 of extension 42 extends laterally from a side wall 48 of base housing 32 near a top thereof. A cover 50, formed with a front side wall 52, is situated on top 46 of extension 42 and supports one or more actuator pads 54. In an alternative embodiment of the invention, actuator pads 54 may extend directly from side wall 48 or any other part of base housing 32.

In the depicted embodiment, jar mount 34 is formed with a planar top edge 56 of a prescribed diameter and a planar bottom edge 58 spaced from the top edge which may have a diameter larger than the prescribed diameter. A curved or conical wall 60 of jar mount 34 is formed with a prescribed curvature as the surface extends between top edge 56 and bottom edge 58 thereof. A conical wall 60 of jar mount 34 blends with an exterior curved shape of base housing 32. It will be appreciated that jar mount 34 may be of any shape configured to connect the base of jar 62 to base housing 32.

Typically the base of jar 62 is formed with threads which mount into corresponding threads formed in an interior wall of a circular rim formed in the interior of jar mount 34. An electric motor 66 (not depicted) is mounted within base housing 32 and is connectable to an external electrical power source through a switch assembly located within extension 42. A drive shaft is coupled to, and driven by, motor 66. A mechanical coupling couples the drive shaft to impeller 74 (not depicted) that is located within the base of jar 62. Upon selective operation of motor 66, impeller 74 is rotated at selected speeds to mix and blend any foodstuff located within jar 62. In alternate embodiments, any suitable base section could be provided.

In the preferred embodiment, jar 62 is preferably a conventional blender jar made of glass or plastic. However, in alternate embodiments, jar 62 may include multiple members, including ones made of metal. Jar 62 includes a handle 76 and a generally open top aperture. A lid section 78 is preferably removably mounted to the top of jar 62 at the top aperture, such as with a friction fit, snap connectors, or other means well known in the art for example. In alternate embodiments any, suitable jar and any suitable jar section may be provided, including a lid section 78 that is pivotally mounted to jar 62.

Figure 2:
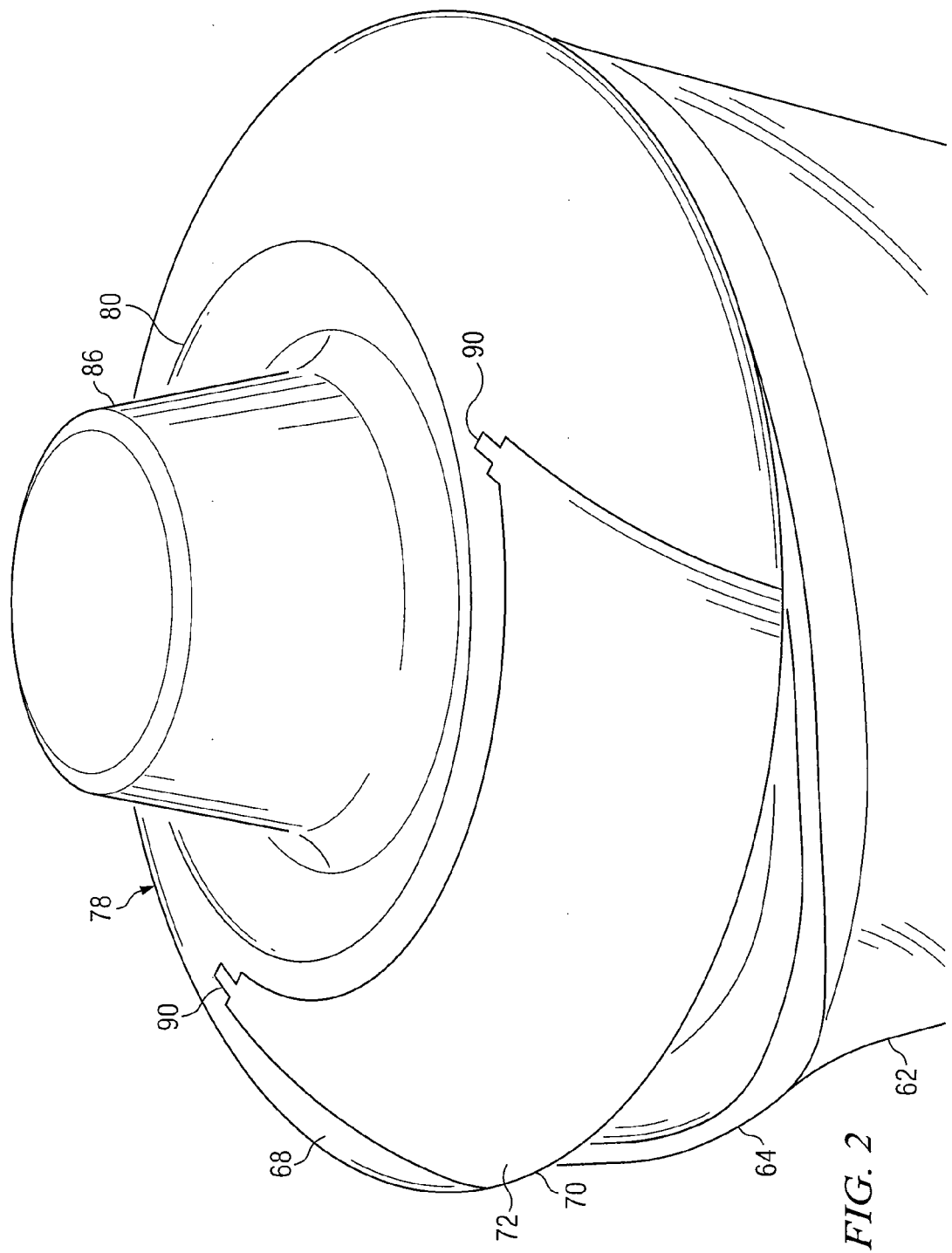
FIG. 2 is a partial perspective view of the top of the blender shown in FIG. 1 with the lid in a closed position.
Figure 3:
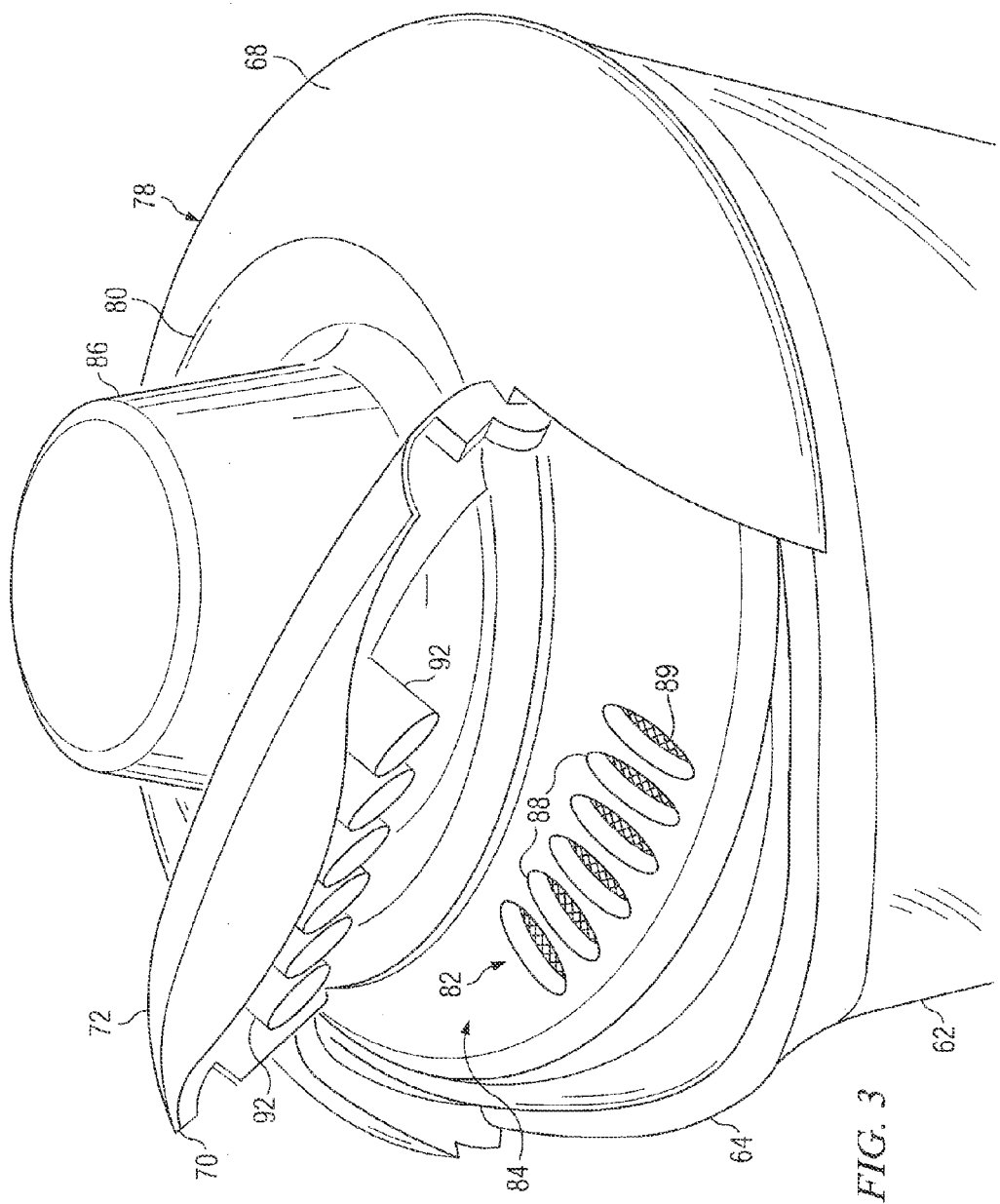
FIG. 3 is a partial perspective view of the top of the blender shown in FIG. 1 with the lid in an open position.

Referring now to FIGS. 2 and 3, the top of jar 62 includes a pour spout 64. In an alternative embodiment, pour spout 64 may not be provided or may not be provided as a part of jar 62. For example, in one embodiment, a pour spout may be provided in lid section 78. As noted above, lid section 78 is removably mounted to the top of jar 62 at the top aperture. In the depicted environment, lid section 78 generally includes a first section 68 and a second section (or closer) 70. Second section 70 may include a flap 72. In a preferred embodiment of the present invention, flap 72 is pivotably connected to first section 68. FIG. 2 shows flap 72 in a closed position in relation to first section 68. FIG. 3 shows flap 72 in an open position in relation to first section 68.

First section 68 is generally sized and shaped to be friction fitted inside the top aperture of jar 62. In the depicted embodiment, first section 68 includes a center aperture 80, a strainer section 82 and a recessed area 84. Lid section 78 further includes a plug 86 which is removably mounted in center aperture 80. However, in an alternate embodiment, center aperture 80 and removable plug 86 might not be included. Removable plug 86 can be removed by a user to allow the user to insert foodstuff into jar 62 without removing entire lid section 78 from jar 62.

Strainer section 82 may include a plurality of holes 88. In the depicted embodiment, holes 88 extend from the bottom of first section 68 to the bottom of recessed area 84 so as to permit the contents of jar 62 of a predetermined size to be poured through holes 88 when lid section 78 is mounted to the top of jar 62 and to retain solids of a predetermined size in jar 62. In this embodiment, holes 88 are substantially parallel, generally radially extending elongated holes. However, in alternate embodiments any suitable holes could be provided. In another embodiment, screen or mesh 89 may be used to cover holes 88 so as to further strain the contents of jar 62.

Flap 72 is sized and shaped to be received in recessed area 84 when flap 72 is in its closed position (see FIG. 2). In addition to flap 72, in the depicted embodiment, second section 70 includes pivot arms 90 and projections or teeth 92. In a preferred embodiment, second section 70 is a one-piece molded plastic member. In an alternative embodiment, second section 70 may include multiple members connected to each other. In the depicted embodiment, pivot arms 90 pivotably connect flap 72 to first section 68. Projections 92 extend from the bottom side of flap 72. In the depicted embodiment, projections 92 are sized and shaped to extend into holes 88 in first section 68 when flap 72 is in its closed position. Therefore, when flap 72 is in its closed position inside recessed area 84, projections 92 extend into holes 88 to substantially plug or block holes 88. When flap 72 is pivoted to its open position, projections 92 are removed from holes 88. It will be appreciated that when flap 72 is pivoted to its open position, foodstuff contained within jar 62 that is smaller than the size of holes 88 may be poured out of jar 62 through holes 88. In another embodiment of the present invention, screen or mesh may cover the bottom of holes 88 so as to permit projections 92 to enter the top of holes 88 but at the same time further strain foodstuff contained within jar 62 when flap 72 is pivoted to its open position and the contents of jar 62 are poured out.

In an alternate embodiment, rather than projections 92 projecting directly into holes 88, first section 68 could include a deeper recessed area having the holes therein. Second section 70 may have a single projection which projects into the deeper recessed area to block off the deeper recessed area and, thus, block off holes 88 with a single projection. In the depicted embodiment, projections 92 can, when moved to the closed position, unclog any foodstuff which gets caught in holes 88 by pushing the foodstuff out of holes 88 and back into jar 62.

Figure 4:
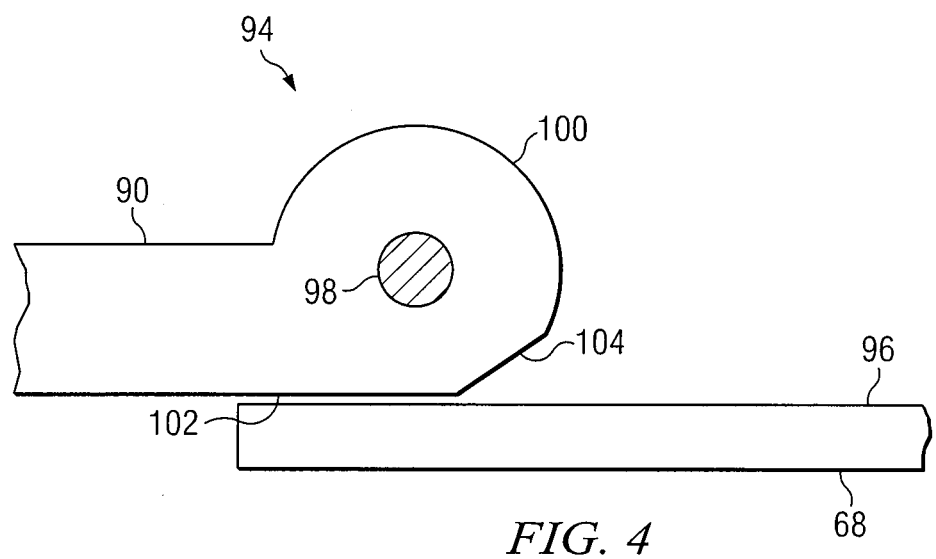
FIG. 4 is a partial cross sectional view of a detent system used in the lid shown in FIGS. 1-3 at a first closed position.

Referring now to FIG. 4, in a preferred embodiment of the present invention, lid section 78 includes a detent system 94 for positively positioning and maintaining flap 72 in at least one position relative to first section 68. In an alternate embodiment, detent system 94 may not be provided. For example, flap 72 could be removable from first section 68 to open a path through holes 88. In the depicted embodiment, detent system 94 includes at least one of pivot arms 90 and a portion 96 of first section 68. Pivot arm 90 is pivotably attached to first section 68 by a pivot pin 98. An end 100 of pivot arm 90 is pivotably attached to pivot pin 98 and includes two flat areas 102 and 104.

Figure 5:
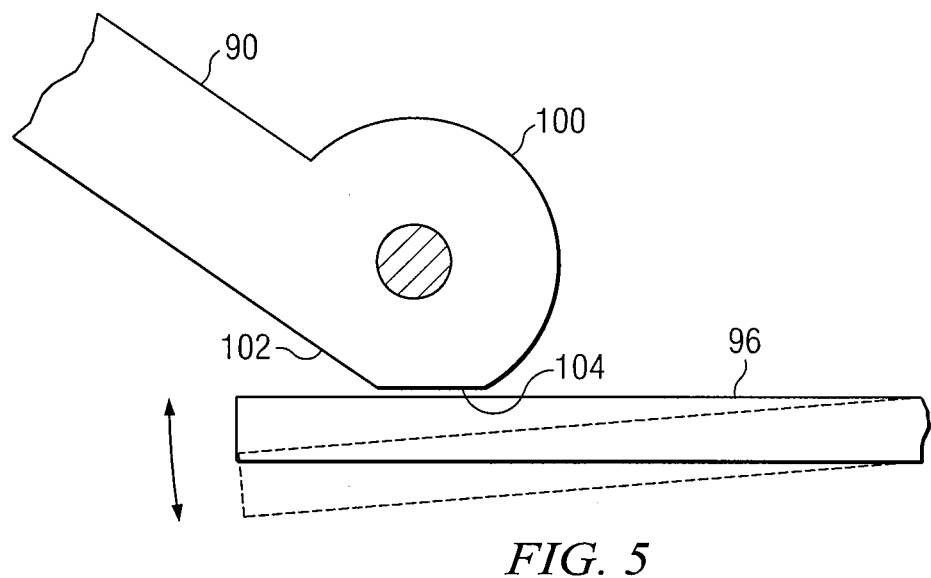
FIG. 5 is a partial cross sectional view of the detent system shown in FIG. 4 in a second open position.

Portion 96 of first section 68 includes a cantilevered deflectable arm such that portion 96 contacts first flat area 102 so as to maintain flap 72 in its closed position (shown in FIG. 4). Flap 72 may be pivoted upward to its open position by a user with detent system 94 then positively locating flap 72 in the open position. As seen in FIG. 5, when flap 72 is rotated, portion 96 can resiliently deflect with second flat section 104 coming to rest on portion 96. Portion 96 can, thus, retain flap 72 at its open position until positively moved by the user again. In alternate embodiments, any suitable type of detent system or system to hold flap 72 could be provided.

It will be appreciated that flap 72 can remain closed during a blender cycle. Flap 72 prevents foodstuff from coming out of jar 62 at holes 88 such as during the blender cycle. Projections 92 may function as gravity feed assist devices to help liquid, which has sprayed upward during a blender cycle onto the bottom side of lid section 78, to drip back downward into the rest of the foodstuff. The size and shape of holes 88 is preferably a predetermined size and shape to allow foodstuff of a predetermined size and liquid to flow out of holes 88 (when flap 72 is moved to its open position) and prevent other foodstuff of a predetermined size from flowing out of jar 62 through holes 88. Thus, it will be appreciated that in the depicted embodiment, lid section 78 has an integral strainer or filter with projections 92 automatically unclogging holes 88 when flap 72 is moved to its closed position.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electric blender comprising:
a base section comprising an electric motor;
a jar section removably connected to the base section, wherein the jar section comprises a jar, and wherein the jar comprises a top aperture and an impeller; and
a lid section removably connected to the jar at the top aperture, wherein the lid section comprises a strainer section and a closer, wherein the strainer section comprises holes adapted to allow contents of a predetermined size and liquid to flow out of the jar and retain solids of a predetermined size inside the jar, and wherein the closer is adapted to close the strainer section to prevent contents of the jar from exiting the strainer section, wherein the lid section further comprises a first section having the strainer section therein, wherein the closer comprises at least one pivot arm coupled to the closer, the at least one pivot arm comprising an end pivotably connected to the first section, wherein the at least one pivot arm comprises a first flat portion proximate the end, wherein the first flat portion is configured to contact the first section for maintaining the closer in an open position relative to the strainer section, wherein the first section comprises a recessed area above the strainer section.

2. An electric blender as in claim 1 wherein the holes comprise substantially parallel, generally radially extending elongated holes.

3. An electric blender as in claim 1 wherein the closer comprises blocker projections which extend into the holes when the closer is in a closed position relative to the strainer section.

4. An electric blender as in claim 1 wherein the lid section further comprises a center aperture with a removable plug located in the center aperture.

5. An electric blender as in claim 1 wherein a bottom side of the closer is adapted to substantially seal the holes when the closer is in a closed position.

6. An electric blender as in claim 1 wherein the at least one pivot arm comprises a pair of pivot arms.

7. An electric blender as in claim 1 wherein the at least one pivot arm further comprises a second flat portion proximate the end, the second flat portion lying in a different plane that the first flat portion, the second flat portion being configured to contact the first section for maintaining the closer in a closed position relative to the strainer section.

8. An electric blender as in claim 1 wherein the strainer section further comprises at least one of a screen material and a mesh material configured to cover the holes and positioned opposite the closer.

9. A lid for a blender jar, the lid comprising:
a strainer section and a closer, wherein the strainer section comprises holes adapted to allow contents of a predetermined size to flow out of the blender jar and retain solids of a predetermined size inside the blender jar, and wherein the closer is adapted to move between a closed position relative to the strainer section and an open position relative to the strainer section and is further adapted to substantially seal the strainer section to prevent contents from exiting the strainer section when in the closed position, wherein the lid comprises a first section having the strainer section therein, wherein the closer comprises at least one pivot arm coupled to the closer, the at least one pivot arm comprising an end pivotably connected to the first section, the closer being configured to pivot away from an outer edge of the strainer section toward a central portion of the lid in the opened position of the closer, wherein the at least one pivot arm comprises a first flat portion proximate the end, wherein the first flat portion is configured to contact the first section to retain the closer in a pivotably open position when in the open position.

10. A lid for a blender jar as in claim 9 wherein the holes comprise substantially parallel, generally radially extending elongated holes.

11. A lid for a blender jar as in claim 9 wherein the closer comprises blocker projections which extend into the holes when the closer is in the closed position.

12. A lid for a blender jar as in claim 9 further comprising a center aperture with a removable plug located in the center aperture.

13. A lid for a blender jar as in claim 9 wherein the at least one pivot arm further comprises a second flat portion proximate the end, the second flat portion lying in a different plane that the first flat portion, the second flat portion being configured to contact the first section to retain the closer in a pivotably closed position when the closer is in the closed position.

14. A lid for a blender jar as in claim 9 wherein the first section comprises a recessed area above the strainer section.

15. A lid for a blender jar as in claim 9 wherein the strainer section further comprises at least one of a screen material and a mesh material configured to cover the holes and positioned opposite the closer.

* * * * *